Patented Jan. 3, 1950

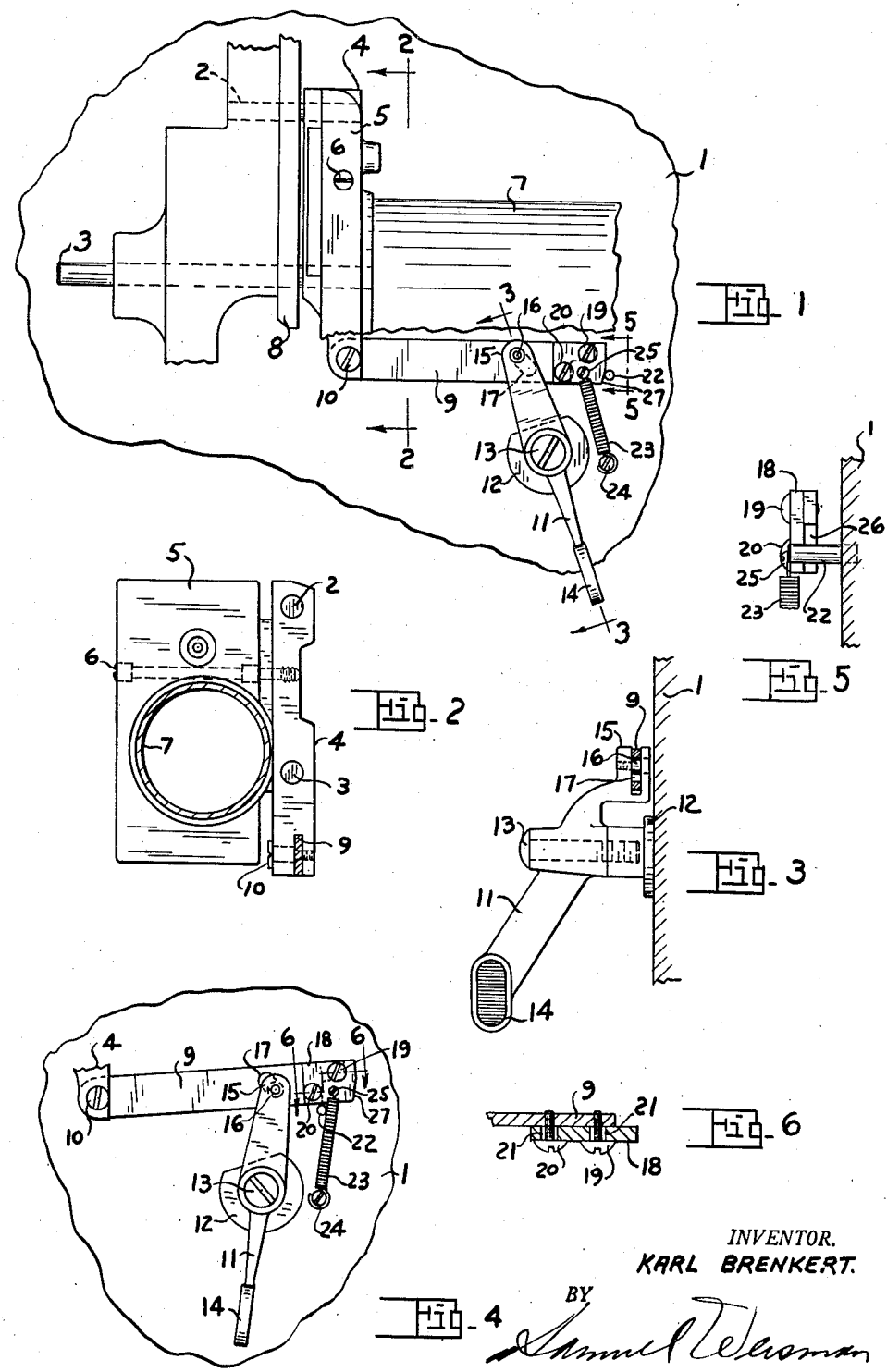

2,493,440

UNITED STATES PATENT OFFICE 2,493,440

GATE ACTUATING MECHANISM FOR MOTION-PICTURE MACHINES

Karl Brenkert, Detroit, Mich., assignor to Radio Corporation of America, a corporation of Delaware Application August 31, 1948, Serial No. 47,037

8 Claims. (Cl. 88—17)

The present invention pertains to a novel actuating mechanism for motion picture machines and particularly projectors.

It has been customary in such machines to employ rather heavy springs for holding the gate closed. Consequently a correspondingly heavy and rather costly mechanism was required to open the gate and hold it open. The manual force necessary to operate such a gate assembly is an inconvenience and annoyance to the operator, for otherwise he would be able to operate the gate with one or two fingers of one hand while using both hands simultaneously for threading the film across the open gate, and to close the gate while holding the film in the proper position.

The principal object of this invention is to dispense with the aforementioned heavy springs and to provide a mechanism that can be operated under the conditions described. Another object is to provide a relatively simple and inexpensive gate actuating mechanism of the character set forth.

In the accomplishment of these objects, an operating arm is extended from the gate, and a lever pivotally mounted on the frame structure is attached to the arm. The rear end of the arm is sloped and is in engagement with a fixed pin on the frame, when the gate is in closed position. A spring connecting the arm to a point on the frame structure wedges the sloped end against the pin to maintain the gate in closed position. The lever has a cam connection to the arm for the purpose of causing the arm to ride over the pin in opening the gate. When the opening movement has been completed, the spring has crossed the pin and now holds the gate positively in the open position. The spring has sufficient strength for the purposes described, yet it permits operation of the mechanism by finger pressure on the lever.

The sloped end of the arm is preferably formed on a lengthwise adjustable section of the arm. In this manner the overall length of the arm is adjustable to compensate for wear of the parts, variations in manufacture and assembly, and to regulate the tension of the spring in the gate-closing position.

The invention is fully disclosed by way of example in the following description and in the accompanying drawings in which:

Figure 1 is a side elevation of the device;

Figure 2 is a section on the line 2—2 of Figure 1;

Figure 3 is a section on the line 3—3 of Figure 1;

Figure 4 is a detail elevation showing a different position;

Figure 5 is an end view on the line 5—5 of Figure 1, and

Figure 6 is a section on the line 6—6 of Figure 4.

Reference to these views will now be made by use of like characters which are employed to designate corresponding parts throughout.

In Figures 1, 3 and 4 is shown a fixed frame member 1 which may be the internal partition of the housing of a motion picture projector. On the member 1 are suitably supported two horizontal guide rods 2 and 3 for a purpose that will presently appear. A slide 4 is mounted on the rods 2, 3 and constitutes a portion of the gate assembly which includes the usual gate member 5 fastened to the slide in any suitable manner as by means of one or more screws 6. A lens tube 7 is mounted adjacent to the gate member 5 in the usual manner.

As in prior constructions, the gate assembly is adapted to be moved into close proximity to an aperture plate 8 and to be moved away from the aperture plate at times for threading a film between the gate and the plate. For this purpose an arm 9 is pivotally attached at 10 to the lower portion of the gate assembly, preferably the slide 4, and extends rearwardly or along the tube 7. For the purpose of actuating the arm 9, a hand lever 11 is pivotally mounted on the member 1 and below the arm in any suitable manner as by means of a boss 12 attached to the member 1 and carrying a pin 13 on which the lever is fulcrumed. The lower end of the lever is formed as a finger piece 14 at the lower end and is forked at 15 at the upper end to receive the arm 9. A pin 16 passed through the fork also passes through an inclined or cam slot 17 in the arm 9, for a purpose that will presently appear. The arm 9 includes, as a portion or extension thereof, a plate 18 attached to its rear end by a pair of screws 19 and 20. The screws pass through oversized holes 21 in the piece 18 to permit an adjustment of the overall length of the arm by setting the piece 18 lengthwise of the member 9, after which the screws are tightened.

A horizontal pin 22 mounted on the member 1 engages the rear end of the arm when the gate is in closed position as shown in Figure 1. A coil spring 23 has its lower end fastened on a screw 24 mounted on the member 1 in substantial vertical alinement with the pin 22. The upper end of the spring is engaged on a small screw 25 mounted on the plate 18 below the screw 19, and the rear end of the member 9 may be relieved at 26, if necessary, to avoid interference with the screw 25.

The rear end of the arm 9, 10 is sloped downwardly and forwardly at 27 for engagement by the pin 22 when the parts are in gate-closing position. The spring 23 causes a wedging of the slope 27 against the pin 22 to hold the gate closed with the force of the spring. When it is desired to open the gate or withdraw it from the plate 8, the lower end 14 of the lever 11 is swung forwardly to exert a rearward pressure of the pin 16 in the cam slot 17. Because of the slope of the slot 17, the arm assembly is raised sufficiently to bring its lower edge in riding relation on the pin 22, as shown in Figure 4. At the same time, the spring 23 crosses to the other side of the pin 22 and maintains the open position shown in Figure 4.

As previously indicated, it has been customary to employ strong springs to hold the gate closed, and consequently a heavy and somewhat complicated device was required to hold the gate open under the pressure of the strong springs. The manual force required for this operation is disturbing to the operator, since he would like to actuate the gate with the finger of one hand while using both hands simultaneously in threading the film. The relatively light construction herein disclosed permits convenient opening and closing of the gate in the manner described. The lengthwise adjustability of the plate 18 on the main arm member 9 permits adjustment of the overall length to compensate for wear, irregularities in manufacture and assembly, and to regulate the pressure of the spring 23 in the gate-closing position. The spring, although relatively light, is sufficient to hold the gate open or closed with adequate force.

Although a specific embodiment of the invention has been illustrated and described, it will be understood that various alterations in the details of construction may be made without departing from the scope of the invention as indicated by the appended claims.

What I claim is:

1. A gate actuating mechanism for motion picture machines comprising, in combination with a fixed frame member and a gate assembly slidably mounted thereon, an arm pivotally attached to said assembly and lying substantially parallel to the sliding direction of said assembly, an operating lever mounted on said member and pivotally attached to said arm, the rear end of said arm being sloped, a pin on said member and engaging said sloped end when the gate assembly is in closed position, and an expanded spring having its ends attached respectively to said member and arm and positioned to wedge said end against said pin.

2. A gate actuating mechanism for motion picture machines comprising, in combination with a fixed frame member and a gate assembly slidably mounted thereon, an arm pivotally attached to said assembly, an operating lever mounted on said member and having a cam connection to said arm adapted to move said arm vertically on movement of said lever in the gate-opening direction, the rear end of said arm being sloped, a pin on said member and engaging said sloped end when the gate assembly is in closed position, and an expanded spring having its ends attached respectively to said member and arm and positioned to wedge said end against said pin.

3. A gate actuating mechanism for motion picture machines comprising, in combination with a fixed frame member and a gate assembly slidably mounted thereon, an arm pivotally attached to said assembly and lying substantially parallel to the sliding direction of said assembly, an operating lever mounted on said member and pivotally attached to said arm, the rear end of said arm being sloped, a pin on said member and engaging said sloped end when the gate assembly is in closed position, and an expanded spring having its ends attached respectively to said member and arm and positioned to wedge said end against said pin, said spring being positioned to cross said pin on movement of said lever and arm to gate-opening position.

4. A gate actuating mechanism for motion picture machines comprising, in combination with a fixed frame member and a gate assembly slidably mounted thereon, an arm pivotally attached to said assembly, an operating lever mounted on said member and having a cam connection to said arm adapted to move said arm vertically on movement of said lever in the gate-opening direction, a plate adjustable lengthwise on the rear portion of said arm, the rear end of said plate being sloped, a pin on said member and engaging said sloped end when the gate assembly is in closed position, and an expanded spring having its ends attached respectively to said member and arm and positioned to wedge said end against said pin.

5. A gate actuating mechanism for motion picture machines comprising, in combination with a fixed frame member and a gate assembly slidably mounted thereon, an arm pivotally attached to said assembly, a lever mounted on said member and pivotally attached to said arm, a plate adjustable lengthwise on the rear portion of said arm, the rear end of said plate being sloped downwardly and toward the pivot point of the arm, an expanded spring having its ends attached respectively to said member and arm, and a pin on said member and engaging said sloped end when the gate assembly is in closed position, said spring being positioned to cross said pin on movement of said lever and arm to gate-opening position.

6. A gate actuating mechanism for motion picture machines comprising, in combination with a fixed frame member and a gate assembly slidably mounted thereon, an arm pivotally attached to said assembly, an operating lever mounted on said member and having a cam connection to said arm adapted to move said arm vertically on movement of said lever in the gate-opening direction, a plate adjustable lengthwise on the rear portion of said arm, the rear end of said plate being sloped, a pin on said member and engaging said sloped end when the gate assembly is in closed position, and an expanded spring having its ends attached respectively to said member and arm and positioned to wedge said end against said pin.

7. A gate actuating mechanism for motion picture machines comprising, in combination with a fixed frame member and a gate assembly slidably mounted thereon, an arm pivotally attached to said assembly, a lever mounted on said member, said arm having a cam slot at which said lever is attached to the arm, said slot being shaped to raise said arm on movement of said lever in the gate-opening direction, the rear end of said arm being sloped downwardly and toward the pivot point of the arm, an expanded spring having its ends attached respectively to said member and arm, and a pin on said member and engaging said sloped end when the gate assembly is in closed position, said spring being positioned to cross said pin on movement of said lever and arm to gate-opening position.

8. A gate actuating mechanism for motion picture machines comprising, in combination with a fixed frame member and a gate assembly slidably mounted thereon, an arm pivotally attached to said assembly, a lever mounted on said member, said arm having a cam slot at which said lever is attached to the arm, said slot being shaped to raise said arm on movement of said lever in the gate-opening direction, a plate adjustable lengthwise on the rear portion of said arm, the rear end of said plate being sloped downwardly and toward the pivot point of the arm, an expanded spring having its ends attached respectively to said member and arm, and a pin on said member and engaging said sloped end when the gate assembly is in closed position, said spring being positioned to cross said pin on movement of said lever and arm to gate-opening position.

KARL BRENKERT.

REFERENCES CITED

The following references are of record in the file of this patent:

FOREIGN PATENTS

| Number | Country | Date |
| --- | --- | --- |
| 452,853 | Germany | Nov. 21, 1927 |